United States Patent [19]  
Dorlars et al.

[11] B 3,925,390  
[45] Dec. 9, 1975

[54] TRIAZOYL-NAPHTHALIMIDE BRIGHTENING AGENTS

[75] Inventors: Alfons Dorlars, Leverkusen; Carl-Wolfgang Schellhammer, Opladen, both of Germany

[73] Assignee: Bayer Aktiengesellschaft, Leverkusen-Bayerwerk, Germany

[22] Filed: Jan. 8, 1973

[21] Appl. No.: 322,182

[44] Published under the Trial Voluntary Protest Program on January 28, 1975 as document no. B 322,182.

Related U.S. Application Data

[63] Continuation of Ser. No. 704,524, Feb. 12, 1968, abandoned.

[30] Foreign Application Priority Data

Feb. 21, 1967 Germany.......................... 51581

[52] U.S. Cl. ...... 260/281 NH; 8/1 W; 252/301.2 W  
[51] Int. Cl.²................ C07D 221/14; C07D 249/06  
[58] Field of Search...................... 260/281, 281 NH

[56] References Cited  
UNITED STATES PATENTS

3,362,958  1/1968  Schellhammer................... 260/281

3,666,758  5/1972  Dorlars........................ 260/308 A

FOREIGN PATENTS OR APPLICATIONS

1,154,995  6/1969  United Kingdom................. 260/281

*Primary Examiner*—Donald G. Daus  
*Attorney, Agent, or Firm*—Plumley & Tyner

[57] ABSTRACT

New blue fluorescent 4-[v triazoyl-(2)]-naphthalimides of the formula

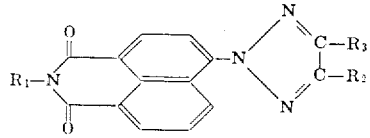

wherein $R_1$ is hydrogen, aliphatic, cycloaliphatic or araliphatic groups $R_2$ and $R_3$ are independently, hydrogen, aliphatic, cycloaliphatic, or aliphatic or monocyclic aryl groups for use as brighteners are disclosed. $R_1$, $R_2$ and $R_3$ can be further substituted.

11 Claims, No Drawings

TRIAZOYL-NAPHTHALIMIDE BRIGHTENING AGENTS

This is a Continuation of application Ser. No. 704,524 filed Feb. 12, 1968, now abandoned.

The invention relates to valuable new blue-fluorescent 4-[v-triazolyl-(2)]-naphthalimides of the formula

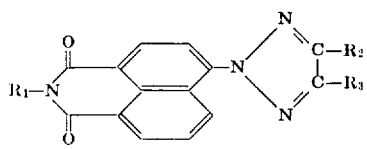

(I)

which are eminently suitable for the use as brightening agents. In general formula $R_1$ denotes hydrogen, an aliphatic hydrocarbon radical containing 1 to 12 carbon atoms, a cycloaliphatic or araliphatic hydrocarbon radical; $R_2$ and $R_3$ represent, independently of one another, hydrogen or 1 to 12 carbon atom-containing aliphatic, cycloaliphatic or araliphatic hydrocarbon radicals, or monocyclic aryl radicals. The aliphatic, cycloaliphatic or araliphatic radicals $R_1$, $R_2$ or $R_3$ may be further substituted and, among the substituents, lower alkyl radicals, lower alkoxy groups, acyloxy radicals, amino groups, nitrile groups, carbalkoxy groups or pyrrolidonyl groups are preferred. The monocyclic aryl radicals $R_2$ or $R_3$ may be further substituted by halogen, by alkyl or lower alkoxy groups.

The new triazolyl-naphthalimides of the formula I can be synthesised according to various preparative methods. The simplest method of preparation consists in that naphthalimides of the formula

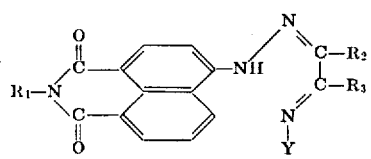

(IIa)

or

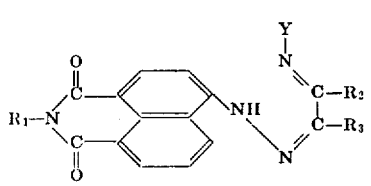

(IIb)

respectively in which $R_1$, $R_2$ and $R_3$ have the same meaning as above, and Y represents a radical capable of being split off, are converted into the compounds (I). This ring closure reaction generally takes place with the splitting off of HY.

The radical Y in the formula II, which is capable of being split off, preferably comprises anionically splittable radicals, such as halogen, as Br, Cl —OH, —O-alkyl-, -O-acyl, tertiary amino groups, such as the dialkyl-amino groups or quaternary ammonium groups, such as trialkyl ammonium groups ("alkyl" here stands for a lower alkyl radical, "acyl" for the radical of an organic or inorganic acid).

The transformation of the compounds (II) into the compounds (I) is carried out, for example, in such a manner that compounds (II) in which Y stands for OH, are converted into the corresponding O-acyl compounds by the treatment with organic or inorganic acids or acid derivatives, especially organic acid anhydrides, for example by the treatment with acetic anhydride into the O-acetyl compound which is then converted into compounds (I) by the action of acids or bases and/or by the action of an elevated temperature, while one mol acid is split off. A preferred embodiment consists in a treatment with acids and simultaneously or subsequently raising the temperature, e.g. to temperatures up to 150°C, or with bases and simultaneously or subsequently raising the temperature, e.g. to temperatures up to 150°C.

The starting compounds (II) required for the aforementioned reaction may be obtained, for example, when 4-aminonaphthalimides of the formula

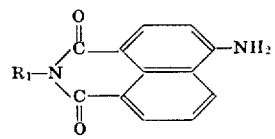

(III)

in which $R_1$ has the same meaning as above, are coupled with nitro-acetaldoxime, the reaction product is dehydrated to give the nitro-v-triazolyl-(2) compound, the nitro group is reduced to the amino group which is again diazotised, and the diazo group subsequently replaced by hydrogen in known manner. In this way, compounds are obtained in which $R_2$ and $R_3$ in the formula (II) stand for hydrogen. Further compounds of the formula (II) can be prepared by condensing naphthalimides of the formula

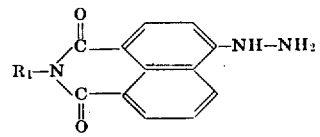

(IV)

or the salts thereof, such as the hydrochlorides or sulphates, or the ω-sulphonic acids of the hydrazines, in which $R_1$ has the same meaning as above, with α-oximino-ketones of the formulae

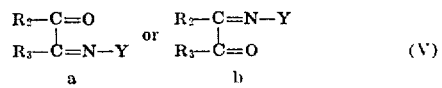

(V)

in which $R_2$, $R_3$ and Y have the above meaning and Y represents, for example, a OH group, and dehydrating the resultant α-oximino-hydrazones in known manner to give the corresponding v-triazolyl-(2) compounds.

A modified method of operation for the production of the new products consists in cyclisation of the compounds

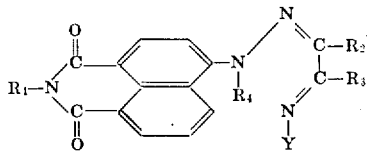

(VIa)

or

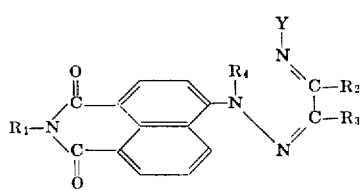

(VIb)

in which $R_4$ stands for a lower alkyl radical, such as methyl and ethyl, and $R_1$, $R_2$, $R_3$ and Y have the above meaning, with the splitting off of $R_4Y$ to give the compounds (I).

The new products of the formula (I) are valuable, blue-fluorescent brightening agents. The object of the invention, therefore, also comprises brightening agents which contain, as active component, blue-fluorescent triazolyl-naphthalimides of the formula (I).

Some examples of the new compounds of the formula (I) may be seen from the working Examples given below.

Compounds (Va) or (Vb) suitable for the preparation of the starting compounds of the formula (II) are inter alia:
oximinoacetone, diacetylmonoxime, 1-oximinopentanone-(2), 2-oximinopentanone-(3), 3-oximinopentanone-(2), 3-oximino-4-methyl-pentanone-(2), 1-oximino-4-methylpenten-(3)-one-(2), 2-oximino-5-methyl-hexanone-(3), 2-oximinoheptanone-(3), 3-oximinoheptanone-(4), 3-oximinooctanone-(2), 3-oximinoundecanone-(2), 2-oximino-1-cyclohexylpropanone-(1), oximinoacetophenone, p-fluoro- and p-chloroximino-acetophenone, p-methoxy- and p-methyloximino-acetophenone, 2,4-dimethyloximinoacetophenone, oximino-propiophenone, 1-oximino-1-phenylacetone, 1-oximino-1-(o-methoxyphenyl)-acetone, 1-oximino-1-o-tolyl-acetone, α-oximino-2,4-dimethoxy-propiophenone, oximino-valerophenone, benzilmonoxime.

The new compounds of the formula (I) are suitable as brightening agents, particularly for the brightening of synthetic materials, e.g. for the brightening of fibres, filaments, fabrics, foils and plastic compositions of aromatic polyesters, such as polyethylene glycol terephthalates, and aromatic polyesters of terephthalic acid and 1,4-bis-hydroxy-methylcyclohexane, of polymers and copolymers based on acrylonitrile as asymmetric dicyano-ethylene, polyvinyl chloride, cellulose 2½-acetate and cellulose triacetate, as well as for the brightening of lacquers produced from cellulose acetates. The application of the brightening agents which contain the compounds of the formula (I) in the pure form or in admixture with other suitable additives is carried out in customary manner, e.g. in the form of aqueous dispersions or in the form of solutions in organic solvents, such as acetone, ethyl acetate, glycol monomethyl-ether acetate, methylene chloride or toluene. If desired, the brightening agents may also be used in combination with detergents, or they may be added to casting compositions which serve for the production of foils or filaments.

Those brightening agents which represent or contain compounds of the formula (I) in which $R_2$ and $R_3$ stand for hydrgen and/or for alkyl or cycloalkyl radicals, are especially well suited for the brightening of materials made from aromatic polyesters, polymers and copolymers of acrylonitrile and cellulose acetates. Besides these compounds, also those triazolyl-naphthalimides of the formula (I) give very good results brightening polyvinyl chloride, in which $R_2$ and/or $R_3$ represent an aralkyl radical or an optionally substituted monocyclic aryl radical.

Those compounds of the formula (I) in which $R_2$ stands for a lower alkyl radical, preferably $CH_3$, $R_3$ stands for H, and $R_1$ stands for a preferably straight-chain alkyl radical containing 2 to 4 carbon atoms, are of outstanding interest as brighteners.

The amounts of the compounds of the formula (I) necessary for the use of a brightening agent can readily be determined in each case by preliminary experiments. In general, amounts of 0.01 to 0.5%, related to the material to be brightened have proved to be sufficient.

In comparison with the known naphthalimide compounds which are most closely related on account of their constitution, such as the 4-[pyrazolyl-(1]-naphthalimides known from Belgian Patent Specification No. 667,986, there can be obtained with the new products used as brighteners surprisingly clear white shades, improved fastness properties to light and a substantially better resistance to chlorite of the materials brightened therewith.

In the following Examples the temperatures are given in degrees centigrade.

EXAMPLE 1

A fabric of fibres made from polyethylene glycol terephthalate is introduced, in a goods-to-liquor ratio 1 : 40, into a bath which contains, per litre, 1.5 g. oleyl sulphonate, 0.75 g formic acid, 0.1 g N-n-propyl-4-[4-methyl-v-triazolyl-(2)]-naphthalimide of the formula

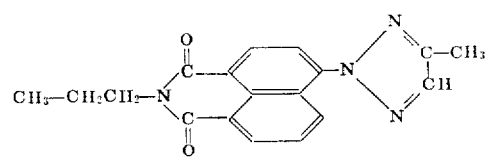

and 2.0 g. sodium chlorite; the bath is then heated to boiling temperature within 30 minutes and kept at boiling temperature for about 45 minutes, the fabric being moderately moved about in the bath. The fabric is subsequently rinsed and dried; it then possesses an outstanding brightening effect.

The N-n-propyl-4-[4-methyl-v-triazolyl-(2)]-naphthalimide is prepared in the following manner.

26.9 g (0.1 mol) N-n-propyl-4-hydrazino-naphthalimide are heated at 75° – 78°C for 2 hours, while stirring with 9.6 g (0.11 mol) oximino-acetone and 5 ml glacial acetic acid in 250 ml alcohol; about half of the alcohol is subsequently distilled off under reduced pressure and, after the mixture has cooled, the resultant α-oximino-hydrazone is filtered off with suction and dried. 31.8 g (0.094 mol) of the α-oximino-hydrazone thus obtained are then dissolved in a mixture of 150 ml dimethyl formamide and 100 ml pyridine, and 14 ml acetic anhydride are added to the solution at 30°. The temperature thereby rises by about 10°; the mixture is subsequently heated to 80° – 85°C, while stirring, and this temperature is maintained for a further 5 hours. After completion of the reaction, about 150 ml of the solvent are distilled off under reduced pressure, and the precipitated crude triazolyl-naphthalimide is filtered off with suction. The crude product is purified by stirring with ammonia-containing alcohol, the residue is filtered off with suction and recrystallised from ammonia-containing dimethyl formamide. Pale yellow crystals of m.p. 158° are obtained.

EXAMPLE 2

A fabric of fibres made from aromatic polyesters is padded with an aqueous liquor which contains, per litre, 1 g of a commercial dispersing and wetting agent, 4 g alginate thickening and a solution of 1 g N-n-propyl-4-[4-methyl-v-triazolyl-(2)]-naphthalimide in 20 g triethanolamine. The fabric is then squeezed out to a weight increase of 100%, thereafter dried and heated at 190° for 1 minute. The fabric thus treated is subsequently washed hot, compared with untreated material, it shows a clear, strong brightening effect of good fastness to chlorine and to light.

EXAMPLE 3

A fabric of polyacrylonitrile fibres is introduced at 30° in a goods-to-liquor ratio 1 : 40, into an aqueous bath which contains, per litre, 1 g oleyl sulphonate, 0.75 g formic acid and 0.1 g N-n-propyl-4-[4-methyl-v-triazolyl-(2)]-naphthalimide. The bath is then heated to 90° to 95° and kept at this temperature for 45 minutes, while the fabric is moderately moved about in the bath. The fabric is subsequently rinsed and dried; it then shows a very beautiful clear brightening effect.

EXAMPLE 4

A fabric of cellulose triacetate fibres is moved about, in a goods-to-liquor ratio 1 : 40, at 90° – 95°C for 30 minutes in the aqueous bath described in Example 3, it is subsequently rinsed and dried. After this treatement, the textile material is outstandingly brightened.

Instead of the N-n-propyl-4-[4-methyl-v-triazolyl-(2)]-naphthalimide, there may also be used N-ethyl-[4-methyl-v-triazolyl-(2)]-naphthalimide or N-ethyl-[4-isopropyl-5-methyl-v-triazolyl-(2)]-naphthalimide which can be obtained, according to the process described in Example 1, from the appropriate starting compounds by condensing N-ethyl-4-hydrazino-naphthalimide with oximino-acetone or with 4-methyl-3-oximino-pentanone-(2) and dehydrating the α-oximino-hydrazones thus obtained to give the v-triazolyl-naphthalimides.

EXAMPLE 5

A spinning solution, prepared in conventional manner of 1 kg cellulose acetate in 4 litres acetone is mixed with a solution of 1.5 g N-acetoxy-ethyl-4-[4-methyl-v-triazolyl-(2)]-naphthalimide in a little acetone and spun in known manner. The resultant filaments show a very brilliant, light-fast brightening effect.

The brightening agent used was prepared by condensing N-β-hydroxyethyl-4-hydrazino-naphthalimide with oximino-acetone and ring closure of the resultant α-oximino-hydrazone with acetic anhydride, according to the instructions given in Example 1, while using twice the amount of acetic anhydride for the simultaneous acetylation of the β-hydroxyethyl group.

Similar good results are obtained by using, instead of the N-acetoxyethyl-4-[4-methyl-v-triazolyl-(2)]-naphthalimide, one of the brightening agents used in the preceding Examples.

EXAMPLE 6

65 g polyvinyl chloride with a K-value of 72 – 74, 35 g dioctyl-phthalate, 2 g of a commercial, tin-containing organic stabiliser, 1 g titanium dioxide (rutile) and 0.1 g N-ethyl-4-[4-isopropyl-5-methyl-v-triazolyl-(2)]-naphthalimide are rolled on a hot roller, with slight friction, at about 165° –170° for 5 minutes; the rolling sheet thus obtained is then drawn off on a four-roller calender to give a film about 300 μ thick. The film is outstandingly brightened; the brightening effect is very fast to light.

When, in place of N-ethyl-4-[4-isopropyl-5-methyl-v-triazolyl-(2)]-naphthalimide, N-n-butyl-4-[4-phenyl-v-triazolyl(2)]-naphthalimide is used, a similarly valuable brightening effect is obtained. This compound is obtainable by condensation of N-n-butyl-4-hydrazino-naphthalimide with oximino-acetophenone and ring closure of the resultant α-oximino-hydrazone, according to the instructions given in Example 1.

EXAMPLE 7

According to the instructions for production given in the preceding Examples, the 4-[v-triazolyl-(2)]-naphthalimides listed in the following Table can also be obtained, which yield good brightening effects on the specified materials.

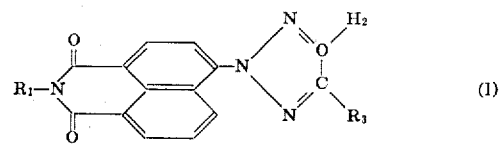

(1)

| R₁ | R₂ | R₃ | M.P. (° C.) | Material |
|---|---|---|---|---|
| C₂H₅ | CH₃ | H | 203 | PE |
| C₂H₅ | CH₃ | CH₃ | 186 | AC, TR |
| C₂H₅ | CH(CH₃)₂ | CH₃ | 118–119 | PE, PVC |
| C₂H₅ | C₆H₅ | H | 208 | PVC |
| C₂H₅ | C₆H₅ | CH₃ | 146–147 | PVC |

−Continued

| R₁ | R₂ | R₃ | M.P. (° C.) | Material |
|---|---|---|---|---|
| n-C₃H₇ | CH₃ | H | 158 | PE, PA |
| n-C₃H₇ | C₆H₅ | H | 219.5 | PVC |
| n-C₄H₉ | CH₃ | H | 111 | PE, PA |
| n-C₄H₉ | CH₃ | CH₃ | 155–156 | PE |
| n-C₄H₉ | C₆H₅ | H | 182 | PVC |
| CH₂—CH₂—OH | CH₃ | H | 184–186 | AC |
| CH₂—CH₂—O—CO—CH₃ | CH₃ | H | 144 | PE, AC |
| CH₃ | CH₃ | H | ........ | TR |
| n-C₄H₉ | C₆H₅ | C₂H₅ | ........ | PVC |
| CH₃—CH₂O—CO—C₃H₇ | CH₃ | H | ........ | PE, AC |
| n-C₁₂H₂₅ | CH₃ | H | ........ | PVC |
| —CH₂—CH(nC₄H₉)(C₂H₅) | CH₃ | CH₃ | ........ | PVC |
| —⟨H⟩ (cyclohexyl) | CH₃ | H | ........ | PE |
| —⟨H⟩—CH₃ (methylcyclohexyl) | CH₃ | H | ........ | PE |
| —CH₂—⟨⟩ (benzyl) | CH₃ | H | ........ | PE |
| CH₃—CH₂—CH₂—N⁺(CH₃)₃ | CH₃ | H | ........ | PA |
| C₂H₅ | C₂H₅ | n-C₃H₇ | ........ | AC, PVC |
| H | H | CH₃ | 320–321 | PVC |
| H | CH₃ | n-C₁₀H₂₁ | 147–148 | PVC |
| CH₃ | H | CH₃ | 226.5 | PE, PVC |
| CH₃ | C₂H₅ | n-C₃H₇ | 106–107.5 | PVC |
| CH₃ | H | —⟨⟩(CH₃)₂ (3,5-dimethylphenyl) | 192–193 | PVC |
| C₂H₅ | n-C₄H₉ | n-C₃H₇ | 78–80 | PVC, PP |
| C₂H₅ | n-C₁₀H₂₁ | CH₃ | 81–83 | PE, PVC, PP, PM |
| C₂H₅ | —⟨⟩—CH₃ | H | 226–227 | PVC |
| C₂H₅ | —⟨⟩(CH₃)—CH₃ | H | 223–224.5 | PVC |
| i-C₃H₇ | C₂H₅ | n-C₃H₇ | 81–83 | PVC, PP |
| —CH₂—CH(CH₃)₂ | C₂H₅ | n-C₃H₇ | 70–72.5 | PVC, PP |
| —CH₂—CN | H | CH₃ | ........ | PVC, TR, AC |
| n-C₄H₉ | CH₃ | C₂H₅ | 115–116 | PVC, PP |
| C₂H₅ | C₂H₅ | CH₃ | 139–140 | PE, PVC |
| n-C₄H₉ | C₂H₅ | n-C₃H₇ | 72–73 | PVC, PP |
| n-C₄H₉ | n-C₃H₇ | n-C₄H₉ | 70–72 | PVC, PP |
| n-C₄H₉ | i-C₃H₇ | CH₃ | 101–102 | PVC, PP, PM |
| n-C₄H₉ | n-C₁₀H₂₁ | CH₃ | 83 | PVC, PP, PM |
| n-C₄H₉ | —⟨⟩ (phenyl) | —⟨⟩ (phenyl) | 158 | PVC |
| —CH₂CH(n-C₄H₉)(C₂H₅) | CH₃ | CH₃ | 81–82.5 | PVC, PP |
| —CH₂CH(n-C₄H₉)(C₂H₅) | CH₃ | —⟨⟩—Cl (chlorophenyl) | 121–122.5 | PVC |
| n-C₁₂H₂₅ | H | —⟨⟩ (phenyl) | 144 | PVC |
| —(CH₂)₃N(CH₃)₂ | CH₃ | H | ........ | PA |
| —CH₂CH(n-C₄H₉)(C₂H₅) | H | CH₃ | 99–100 | PE, PVC |

NOTE.—The abbreviations in the last column of the table have the following meanings: PE = polyethylene glycol terephthalate fibre or polyethylene glycol terephthalate fibre dyed from the spinning solution; PM = polymethacrylate; PP = polyolefines; TR = cellulose triacetate fibre or triacetate dyed from the spinning solution; AC = cellulose-2½ acetate fibre; PA = polyacrylonitrile fibre; PVC = polyvinyl chloride.

The abbreviations in the last column of the Table have the following meanings:
PE = polyethylene glycol terephthalate fibre or polyethylene glycol terephthalate fibre dyed from the spinning solution
PM = polymethacrylat
PP = polyolefines
TR = cellulose triacetate fibre or triacetate dyed from the spinning solution
AC = cellulose-2 ½ acetate fibre
PA = polyacrylonitrile fibre
PVC = polyvinyl chloride

EXAMPLE 8

1 g N-acetoxyethyl- or N-butoxyethyl-4-[4-methyl-v-triazolyl-(2)]-naphthalimide is dissolved in 1000 g of a colourless lacquer of nitrocellulose or cellulose acetate. The lacquer is then thinly spread on a colourless bottom. After drying, the lacquer film is outstandingly brightened.

N-n-butoxyethyl-4-[-4-methyl-v-triazolyl-(2)]-naphthalimide is obtained by reacting N-hydroxyethyl-4-[4-methyl-v-triazolyl-(2)]-naphthalimide with butyric acid chloride.

EXAMPLE 9

6 Kilograms dimethyl terephthalate and 5 litres ethylene glycol are mixed in a stirrer autoclave of 30 litres capacity with 3 g zinc acetate and 4 g N-n-butyl-4-[4-phenyl-v-triazolyl-(2)]-naphthalimide. The autoclave is first heated to 180° while stirring. The transesterification starts at about 150°; the methanol which is distilled off is condensed in a cooler and collected. The temperature is raised to 200° after one hour and to 220° after a further 45 minutes. The transesterification is completed after about 2 hours and 45 minutes. For precondensation the mixture is subsequently pressed with nitrogen into another autoclave of 20 litres capacity, which has been heated to 275°. The excess glycol is distilled off and collected. After 45 minutes, there is first applied a slight vacuum; the pressure is lowered to below 1 mg Hg in the course of a further 45 minutes while stirring is continued only slowly. When the polycondensation is completed (about 2 ½ hours after a pressure of 1 mm Hg has been reached), the resultant melt is extruded in known manner to filaments of a titre of 50/25 den. The filaments so obtained exhibit an eminently clear brightening effect which is fast to light and wet processing and stable to chlorite.

The brightening agent used was prepared by condensation of N-n-butyl-4-hydrazinonaphthalimide with oximino-acetophenone and ring closure of the resultant α-oximino-hydrazone with acetic anhydride in the presence of sodium acetate. The product is obtained in the form of pale yellowish crystals of melting point 182°.

EXAMPLE 10

100 Grams of a polyvinyl chloride suspension polymer with a K-value of 75 - 78, 2 g barium-cadmium stearate, 0.5 g of a stabiliser based on dibutyl-tin dilaurate and 1 g titanium dioxide (rutile) are homogenised on a hot roll at about 165°-170° and the rough sheet so obtained is subsequently pressed at 150°-170° under a pressure of 40 - 50 kg/sq.cm to form a plate. The plate so obtained has a slightly yellowish white shade.

If 0.1 g N-ethyl-4-[4-ethyl-5-n-propyl-v-triazolyl-(2)]-naphthalimide is added to the mixture before rolling on the hot roll, then there is obtained a substantially lighter, very clear and pure white shade which is fast to light and has no tendency to yellow.

The brightening agent used was prepared by condensation of N-ethyl-4-hydrazino-naphthalimide with 3-oximino-heptanone-(4) and ring closure of the resultant α-oximino-hydrazone with acetic anhydride according to the instructions given in Example 1. Greenish light-coloured crystals of melting point 92°-93.5°.

Similarly good results are obtained when the N-ethyl-4-[4-ethyl-5-n-propyl-v-triazolyl-(2)]-naphthalimide is replaced with the same amount of N-ethyl-4-[4-isopropyl-5-methyl-v-triazolyl-(2)]-naphthalimide.

EXAMPLE 11

A fabric of polypropylene fibres is padded with an aqueous liquor containing, per litre, 1 g sodium butyl-naphthalene sulphonate, 1 g nonylphenol polyglycol ether, 4 g of an alginate thickening agent, 20 g triethanolamine, and a solution of 1 g N-ethyl-4-[4-n-decyl-5-methyl-v-triazolyl-(2)]-naphthalimide in 20 ml dimethyl formamide. The fabric is then squeezed to a weight increase of 70%, then dried and heated at 135° for 1 minute. The fabric thus treated is subsequently washed hot; as against untreated material, it exhibits a clear intense brightening effect of very good fastness to wet processing, light and chlorite.

EXAMPLE 12

100 g of a polypropylene granulate and 1 g titanium dioxide (rutile) are thoroughly mixed in overhead mixers and extruded at 210°-215° in a kneading worm with flat sheeting die to produce thin foils. A white film is obtained.

If 0.1 g N-n-butyl-4-[4-propyl-5-ethyl-v-triazolyl-(2)]-naphthalimide is added to the polypropylene granulate before adding the titanium dioxide and the process is carried out as described, then there is obtained an excellently brightened foil with a very beautiful white shade of good to very good fastness to light.

The above brightening agent can be obtained by condensation of N-n-butyl-4-hydrazino-naphthalimide with 3-oximino-heptanone-(4) and ring closure of the resultant α-oximino-hydrazone; it consists of light, almost colourless crystals of melting point 72°-73°.

EXAMPLE 13

100 Grams of a polyethylene injection moulding mass are admixed with 1 g titanium dioxide (rutile) in overhead mixers and injection-moulded in an injection moulding machine to form flat platelets. White mouldings of a slightly yellowish tint are obtained.

If 0.1 g N-n-butyl-4-[4-methyl-5-isopropyl-v-triazolyl-(2)]-naphthalimide are mixed with the polyethylene granulate together with the titanium dioxide and the process is carried out as described above, then the mouldings exhibit a strongly brightened white shade of good fastness to light.

The brightening agent used was obtained by condensation of N-n-butyl-4-hydrazino-naphthalimide with 3-oximino-4-methyl-pentanone-(2) and ring closure of the condensation product according to the instructions of Example 1. The product consists of light, almost colourless crystals of melting point 101°-102°.

EXAMPLE 14

100 Grams of polymethacrylate granulate are injection-moulded in an injection moulding machine to produce flat platelets. The platelets are clear and transparent with a slight grey tint.

If 0.01 to 0.02 g of the brightening agent used in Example 12 are intensely mixed, for example, in overhead mixers, with the polymethacrylate, then the platelets obtained after injection-moulding are of substantially clearer appearance and have no longer the grey tint.

EXAMPLE 15

100 Grams polystyrene granulate are rolled with 1 g titanium dioxide (rutile) on a hot roll at 155°-160° to produce a rough sheet which is subsequently granulated and injection-moulded in an injection-moulding machine at 240°–250° to produce step platelets of 0.5 to 3 mm thickness. White, completely opaque mouldings are obtained.

If 0.1 g of the brightening agent used in Example 10 is added to the polystyrene granulate together with the titanium dioxide and the process is continued as described above, then the mouldings obtained exhibit an additional brightening effect and have a very pure white shade of good fastness to light and weather.

EXAMPLE 16

To a mixture of 15.3 g collodium wool (moist, containing 55% butanol), 7.5 g ethyl acetate, 19 g butyl acetate, 4 g ethyl glycol, 23.4 g toluene and 3 g butanol there are added 20 g of an alkyd resin (60% in xylene), 1.8 g of melamine-formaldehyde condensation product, 3 g dioctyl-phthalate and 3 g castor oil, and 0.5 g titanium dioxide (rutile) are evenly distributed in this mixture. A covering white is obtained with this lacquer mass by spreading.

If 0.1 g of the brightening agent used in Example 13 is added to this mixture, then there is obtained a substantially lighter white - lime white - shade of good fastness to light and weather.

EXAMPLE 17

Fabrics of polyethylene glycol terephthalate fibres which have a yellowish appearance are washed at 75° with a commercial detergent containing about 20% of synthetic washing-active substances and, optionally, complex phosphates, sodium silicate, carboxymethyl cellulose, sodium perborate, and 0.2% N-n-butyl-4-[-4-methyl-v-triazolyl-(2)]-naphthalimide as brightening agent. After rinsing and drying, the fabrics have a bright white appearance.

We claim:
1. Triazolyl-naphthalimide of the formula

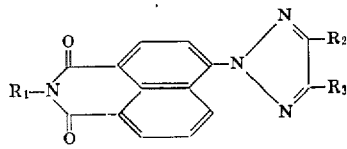

wherein $R_1$ is hydrogen, unsubstituted alkyl with 1-12 carbon atoms, β-acetoxyethyl, β-hydroxyethyl, β-propionoxyethyl, 3-dimethyl aminopropyl, cyanomethyl, β-butoxyethyl, 3-trimethylammonium propyl, cyclohexyl, methylcyclohexyl or benzyl;
$R_2$ and $R_3$ denote independently of one another hydrogen, unsubstituted alkyl with 1–12 carbon atoms, cyclohexyl, phenyl or phenyl mono or disubstituted with fluoro, chloro, methoxy or methyl.

2. Triazolyl-naphthalimide of claim 1 of the formula

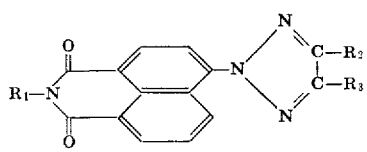

$R_1$ is alkyl with 2–4 carbon atoms;
$R_2$ is alkyl with 1–4 carbon atoms; and
$R_3$ is H or alkyl with 1–4 carbon atoms.

3. Triazolyl-naphthalimide of claim 1 of the formula

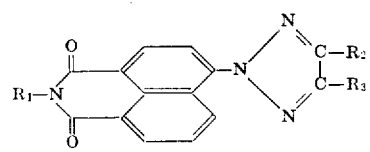

is straight-chain alkyl with 2–4 carbon atoms;
$R_2$ is lower alkyl; and
$R_3$ is H.

4. N-n-propyl-4-[4-methyl-v-triazolyl-(2)]-naphthalimide of the formula

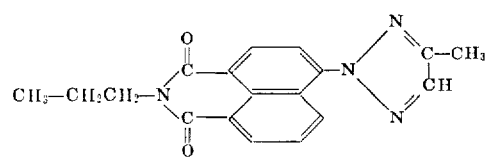

5. N-n-butyl-4-[4-methyl-v-triazolyl-(2)]-naphthalimide of the formula

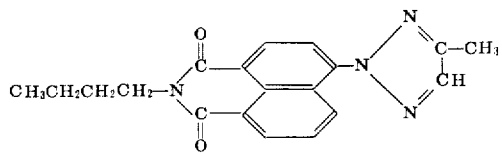

6. N-ethyl-4-[4-methyl-v-triazolyl-(2)]-naphthalimide of the formula

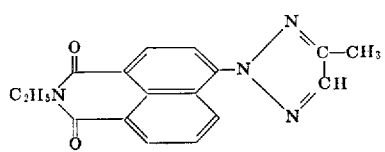

7. N-(β-acetoxyethyl)-4-[4-methyl-v-triazolyl-(2)]-naphthalimide of the formula

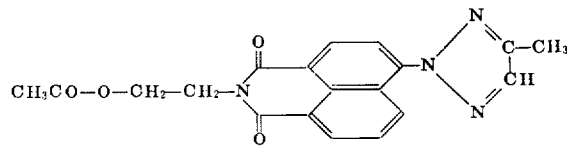

8. N-n-butyl-4-[methyl-5-isopropyl-v-triazolyl-(2)]-naphthalimide of the formula
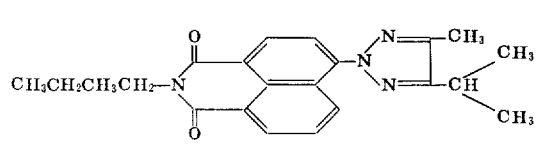
9. N-n-butyl-4-[4,5-dimethyl-v-triazolyl-(2)]-naphthalimide of the formula
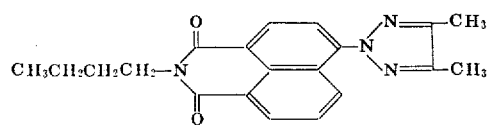
10. N-ethyl-4-[4-ethyl-5-n-propyl-v-triazolyl-(2)]-naphthalimide of the formula
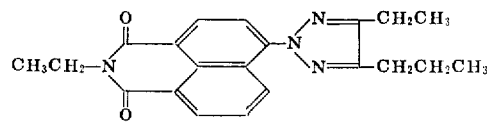
11. N-n-butyl-4-[4-methyl-5-ethyl-v-triazolyl-(2)]-napthalimide of the formula
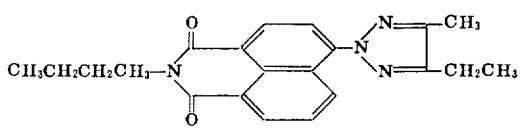
* * * * *